(12) United States Patent
Bösterling et al.

(10) Patent No.: US 9,010,655 B2
(45) Date of Patent: Apr. 21, 2015

(54) SYSTEM FOR SECURING A RAIL ON LEVEL SOLID GROUND

(75) Inventors: Winfried Bösterling, Neuenrade (DE); André Hunold, Iserlohn (DE)

(73) Assignee: Vossloh-Werke GmbH, Werdohl (DE)

( * ) Notice: Subject to any disclaimer, the term of this patent is extended or adjusted under 35 U.S.C. 154(b) by 305 days.

(21) Appl. No.: 12/677,702

(22) PCT Filed: Sep. 12, 2008

(86) PCT No.: PCT/EP2008/062179
§ 371 (c)(1),
(2), (4) Date: May 26, 2010

(87) PCT Pub. No.: WO2009/037204
PCT Pub. Date: Mar. 26, 2009

(65) Prior Publication Data
US 2010/0243752 A1    Sep. 30, 2010

(30) Foreign Application Priority Data

Sep. 14, 2007  (DE) .......................... 10 2007 044 055

(51) Int. Cl.
| | |
|---|---|
| E01B 9/00 | (2006.01) |
| E01B 13/00 | (2006.01) |
| E01B 9/30 | (2006.01) |
| E01B 9/38 | (2006.01) |
| E01B 9/66 | (2006.01) |

(52) U.S. Cl.
CPC . E01B 9/303 (2013.01); E01B 9/38 (2013.01); E01B 9/66 (2013.01); B60L 2200/26 (2013.01)

(58) Field of Classification Search
CPC ............... E01B 9/00; E01B 9/02; E01B 9/32; E01B 9/34; E01B 13/00; E01B 13/02
USPC ................. 238/310, 315–317, 321, 323, 324, 238/331–334, 336, 338
See application file for complete search history.

(56) References Cited

U.S. PATENT DOCUMENTS 4,569,478 A * 2/1986 Bryan ........................... 238/349
4,967,954 A * 11/1990 von Lange ..................... 238/310
(Continued)

FOREIGN PATENT DOCUMENTS

| DE | 2600416 B1 | 3/1977 |
|---|---|---|
| DE | 8505011 U1 | 1/1988 |

(Continued)

*Primary Examiner* — R. J. McCarry, Jr.
(74) *Attorney, Agent, or Firm* — The Webb Law Firm (57) ABSTRACT

The invention relates to a system for securing a rail, including a guide plate for providing lateral support for the rail to be secured, a spring element supported on the guide plate and having at least one spring arm exerting an elastic retaining force on the base of the rail, and tensioning means for tensioning the spring element. Such a system allows an optimally secure support of the rail even in the case of a level ground having no indentations or stop shoulders, whilst being easy to handle and having only a small number of components to be mounted in each case, by providing a support angle which may be connected to the solid ground and which has a bearing surface against which the guide plate rests on the side facing away from the rail base. According to the invention the support angles are made from a plastic material, in order to facilitate assembly and improve the function of the support angles in practical use.

23 Claims, 4 Drawing Sheets

(56) References Cited

U.S. PATENT DOCUMENTS

| | | |
|---|---|---|
| 6,293,473 B1 | 9/2001 | Ortwein et al. |
| 2005/0072522 A1 | 4/2005 | Hayashi et al. |

FOREIGN PATENT DOCUMENTS

| | | | |
|---|---|---|---|
| DE | 8505011 | * 2/1988 | ................ E01B 9/38 |
| EP | 0794289 A1 | 9/1997 | |
| EP | 0758418 B1 | 5/1998 | |
| JP | 08049201 A | 2/1996 | |
| JP | 2006200236 A | 8/2006 | |
| KR | 2020000006534 U | 4/2000 | |
| RU | 2276674 C2 | 5/2006 | |
| RU | 2300599 C2 | 6/2007 | |
| WO | 2007082553 A1 | 7/2007 | |
| WO | 2007096621 A1 | 8/2007 | |

* cited by examiner

Fig. 2

SYSTEM FOR SECURING A RAIL ON LEVEL SOLID GROUND

BACKGROUND OF THE INVENTION

The invention relates to a system for securing a rail to a level solid ground, including a guide plate, for providing lateral support for the rail to be secured, a spring element supported on the guide plate and having at least one spring arm exerting an elastic retaining force on the base of the rail, and tensioning means for tensioning the spring element, a support angle being provided, which is connectable to the solid ground and which has a bearing surface against which the guide plate rests on the side facing away from the rail base. Such a system is known from WO 2007/082553 A1.

Solid ground, like base plates, concrete railroad sleepers or ties or the like, on which systems according to the invention are mounted is also referred to as "slab track systems". Unlike a railway superstructure formed from loose ballast, they normally do not have any inherent compliance. Slab track systems are typically formed by concrete slabs, onto which sleepers also cast from concrete may be laid, which in turn support the rails.

Lateral support of the rails on such a solid ground is, as a rule, provided by means of support facilities positioned on both sides of the rail base between the rail base and respective stops which are each positioned at a lateral distance from the rail base. To this end, the stop is commonly moulded on to the respective solid ground in the form of a support shoulder or the like.

Thus, the concrete sleepers typically used for securing rails to a permanent railway include, as a rule, lateral stop shoulders against which the guide plates intended for laterally guiding the respective rail come to bear. These guide plates are directly fastened either to the solid ground or to the respective sleeper by means of suitable fastening elements, as a rule, screw-bolts. In practice, a system of this kind is known under the designation "System 300".

Usually, the fastening elements are additionally used for tensioning a spring element which exerts a retaining force onto the rail base of the rail to be secured, which is oriented in the direction of the solid ground. Depending on the shape of the ground and the fastening means used, additional spacer and fastening means for a correct orientation and retention of the rails are required.

On railway surfaces which are formed to be level, i.e. do not provide any stop shoulders for laterally supporting the guide plates, fastening systems of the kind described above can not be used.

According to the state of the art disclosed in WO 2007/082553 A1 this problem has been solved in that a support angle is provided for the lateral support of the guide plate required in each case for laterally guiding the rail, which support angle may be bolted to the solid ground and has a bearing surface, against which the guide plate is supported on the side facing away from the rail base. In operation, the support angle will receive the transverse forces emanating from the rail and transmitted by the guide plate. Thus, the support angle enables a fastening system to be mounted on a level surface in a simple manner, without there having to be formed a special stop shoulder or the like. However, in practical use it turns out rather laborious to assemble the support angles which as a rule are made from a steel material.

SUMMARY OF THE INVENTION

Against this background, it is the object of the invention to provide a system for securing rails, which allows an optimally secure support of the rail on level solid ground, whilst being easy to handle.

According to the invention, this object is achieved by means of a system characterised as set out in claim 1. Advantageous embodiments of this system are set out in the claims dependent on claim 1.

According to the invention the support angles used in a system as referred to in the outset and disclosed in WO 2007/082553 A1 are manufactured from a plastic material. Surprisingly it turns out that although support angles made from a plastic material have a lower capacity for absorbing forces such support angles suffice to support a guide plate against the transverse forces emanating during practical use.

The support angles provided according to the invention allow a transmission of the forces occurring during operation, which is particularly kind to the material, via the respective fastening into the solid ground. In addition to that by the use of support angles made from plastic it can be avoided that current linkages occur between the rail and the solid ground on which the rail is fixed. Moreover, the use of a plastics material for manufacturing the support angle allows a considerable weight reduction to be achieved.

As a plastic material for the manufacture of support angles for example a polyolefin or a polyamide may be used.

The support angle may be provided with reinforcement ribs able to safely receive the forces occurring during operation.

The strength of the support angle manufactured of plastic material in accordance with the invention may be further enhanced if the plastics material includes reinforcement fibres.

A particularly good transmission of the forces received by the respective support angle onto the solid ground may be achieved, without any particular preparation of the ground being required for this purpose, by integrally forming into the contact surface of the support angle, which is associated with the surface of the solid ground, a grooved rough structure. The rough structure may preferably be formed to have a serrated cross-section, in order to transmit the respective transverse forces into the ground in a particularly safe manner. To this end, linear indentations extending parallel to the bearing surface may be integrally formed into the contact surface of the support angle.

Alternatively or additionally to a purposeful roughening of the contact surface of the support angle, which is associated with the solid ground, an intermediate layer may be provided, which is positioned between the contact surface of the support angle and the surface of the solid ground and which enhances the friction coefficient between the contact surface of the support angle and the surface of the solid ground. In order to simplify its mounting operation as much as possible, the intermediate layer may be firmly connected to the contact surface of the support angle already during prefabrication of the support angle.

For bolting the support angle to the solid ground, the support angle may include a through-opening for a fixing bolt. A particularly simple mounting procedure, which can preferably be carried out automatically, may be achieved by providing a tensioning element made from an elastic plastics material, which in the mounting condition exerts a return force on the bolt inserted in the through-opening, which return force acts against the clamping force applied by the bolt. This tensioning element is preferably retained in a captive manner directly in the respective through-opening. If such a tensioning element is used, the spring washers which are usually used for tensioning the elements of the known fastening systems and which are often cumbersome to handle, are no longer necessary.

In order to be able to adapt the position of a support angle used according to the invention to the position of the rail or to the guide plate usually present between the rail and each support angle in a simple manner, means may be provided on the support angle, which allow the support angle to be fastened in a position relative to the rail to be secured, in which the bearing surface of the support angle is oriented at an angle to the longitudinal axis of the rail. These adjustment means may be formed by two through-openings integrally formed in the support angle, through each of which a fixing bolt may be inserted such that the distance of one bolt from the bearing surface of the support angle is different to that of the other bolt.

Also, in order to allow a simple adaptation of the position of a support angle used according to the invention to the respective position of the rail or the guide plate, it may be advantageous to provide the support angle with means for adjusting its position in a direction normal to the bearing surface. In practice, these means may be realised for example as an eccentric bush or a toothed disk, which may each be made from plastics.

Another possibility for compensating any manufacturing or mounting inaccuracies of the alignment between the support angle and the rail or the guide plate, which is particularly suitable in practice, is to support the guide plate against the bearing surface of the support angle via a wedge element tapered in the longitudinal direction of the rail to be secured. The provision of such a wedge element between the guide plate and the support angle allows even larger misalignments between the support angle and the guide plate to be compensated, without a specially adapted guide plate being required for this purpose. Rather, in this embodiment of the invention, compensation is carried in each case solely by displacing the wedge element.

In this regard, an essential advantage of the invention is that the guide plate may be fabricated consistently having a uniform wall thickness. This not only results in a minimum weight, but also allows a particularly uniform transmission of the forces received by the guide plate into the wedge element and from there onto the support angle. As a result of this uniform loading, the guide plate may be designed with a particularly small size and with a reduced weight.

In order to ensure an optimal bearing of the support angle and the guide plate on the wedge element, the wedge element should have a first bearing surface associated with the guide plate and a second bearing surface associated with the support angle, which second bearing surface forms an acute angle with the first bearing surface.

Practical experiments have shown that a particularly good effect of a wedge element used according to the invention may be achieved if the bearing surfaces form an angle of 5° to 15°.

Secure retention of the wedge element in the position set in each case during the mounting operation may be achieved if the bearing surface associated with the guide plate has at least one projection and/or recess which may be positively coupled with at least one correspondingly shaped projection and/or recess formed on the bearing surface of the guide plate, which is associated with the respective bearing surface of the wedge element. Preferably, more than one projection and/or recess is provided on the bearing surface associated with the guide plate. By mounting the guide plate and the wedge element in a positively meshing manner whilst tightening the guide plate against the solid ground, the positive coupling of the wedge element and the guide plate is combined with the connection effected by the tensioning force exerted on the wedge element by the guide plate, so that any inadvertent release of the connection between the wedge element and the guide plate is prevented.

In this connection, particularly favourable properties of use of a system according to the invention are achieved if in the mounting condition of the wedge element, the projections and/or recesses extend parallel to the top surface of the level solid ground.

The effectiveness of applying the retention force transmitted by the guide plate onto the wedge element may be enhanced by providing the guide plate with a projection resting, in the mounting position, on the free top surface of the wedge element.

If a positioning of the rail at a certain angle is required for the safe guidance of the respective rail vehicle on the rail to be secured by means of the system according to the invention, then this may be realised with the system according to the invention by means of providing a base plate, by means of which the rail to be secured may be supported on the solid ground, this base plate being provided with a bearing surface associated with the solid ground and a support surface associated with the bottom surface of the rail base of the rail to be secured, and the support surface is oriented, viewed in cross-section, inclined at an angle relative to the contact surface.

Particularly in the case where a base plate is provided, a projection may be formed on that side of the guide plate, which is associated with the rail to be secured, which projection engages with the base plate or the rail base, when in the mounting condition. This projection prevents in a particularly safe and yet simple manner a lifting off of the guide plate under unfavourable operating conditions. In the case where an elastic intermediate layer is provided, on which the base plate rests in the fully mounted condition of the system according to the invention, a recess may be formed on the intermediate layer for this purpose, which in the mounting position is engaged by the projection.

BRIEF DESCRIPTION OF THE DRAWINGS

The invention will be explained in more detail by means of drawings showing an embodiment example, wherein.

DETAILED DESCRIPTION OF THE PREFERRED EMBODIMENTS

Figure 1:
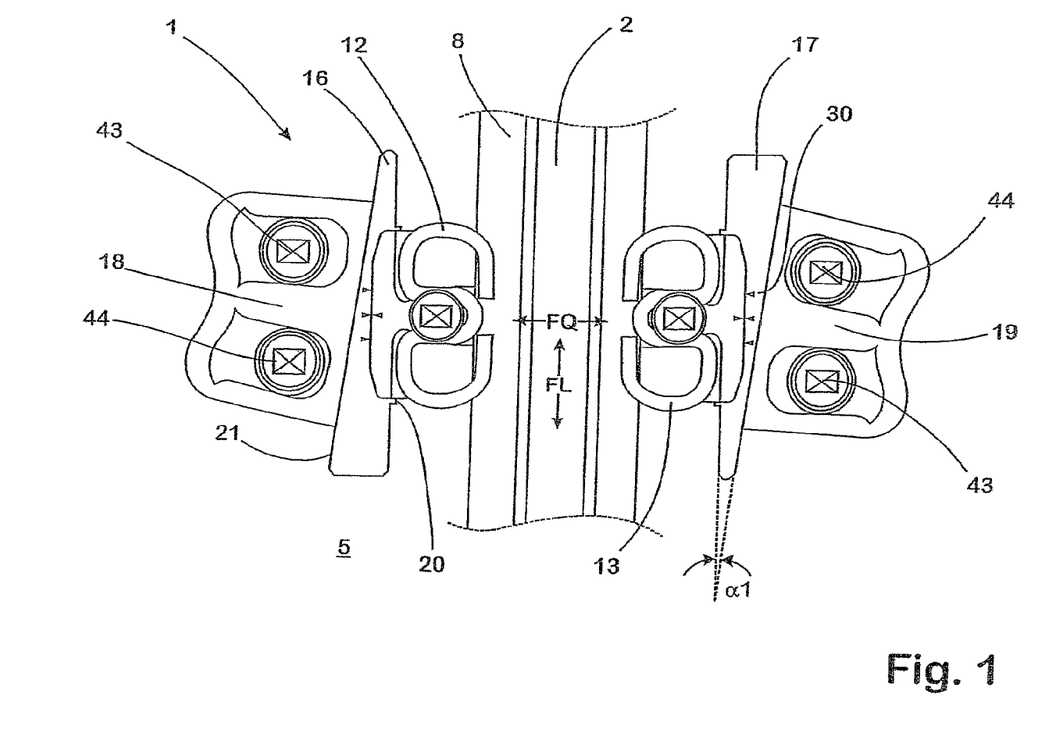
FIG. 1 shows a top view of a system for securing a rail.
Figure 2:
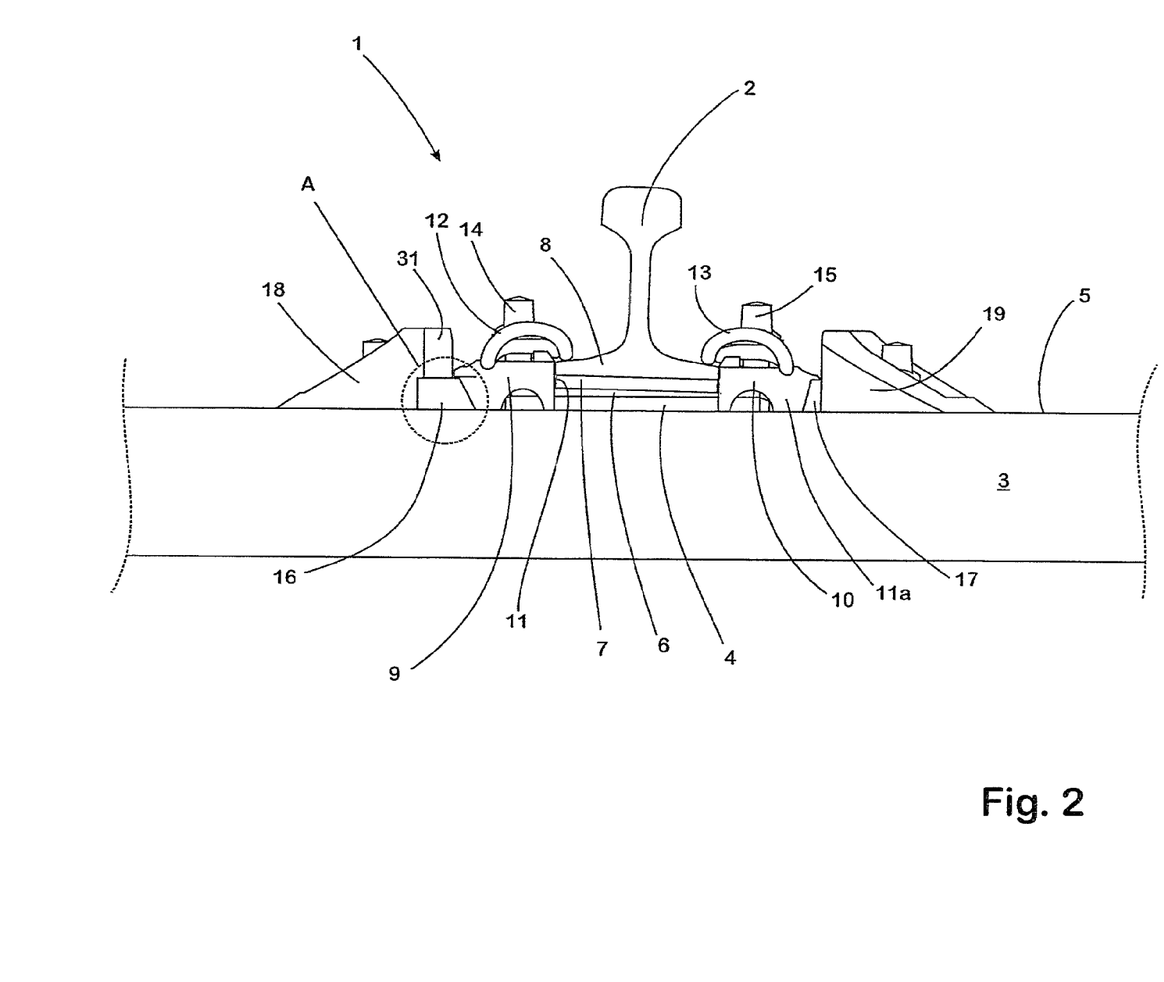
FIG. 2 shows a partially sectioned front view of the system shown in FIG. 1.

System 1 for securing a rail 2 on solid ground 3 formed by a concrete slab comprises an elastic intermediate plate 4 resting directly on the continuously plane surface 5 of the solid ground 3.

On the intermediate plate 4 lies a base plate 6 made from steel, which covers the intermediate plate 4 and distributes in practical operation the loads acting on the base plate 6 via the rail 2, which are caused by a rail vehicle (not shown) driving over the rail 2, onto the intermediate plate 4.

A further intermediate plate 7 is placed on the base plate 6, the width of which corresponds at most to the width of the rail base 8 of the rail, which stands with its bottom surface on top of the intermediate layer 7.

In order to adjust any required inclination of the rail 2 relative to the plane surface 5 of the solid ground 3, the base plate 6 may have a wedge-shaped cross-section, with the top surface associated with the rail base 8 forming an acute angle with the bottom surface of the base plate 6, which is associated with the intermediate plate 4.

To provide lateral support for the rail 2 against transverse forces occurring whilst a vehicle travels thereon, a guide plate 9, 10 is provided on either side of the rail base 8. Each of the guide plates 9, 10 has a support surface 11 bearing against the rail base 8 and stands through corresponding support portions 11a on the plane surface 5 of the solid ground 3.

On its bottom portion adjacent to the surface of the solid ground 3, a cam-type projection (not shown here) may be formed onto the support surface 11 of the guide plates 9, 10, which projects into a correspondingly shaped recess (also not shown here) of the elastic intermediate plate 4 and engages behind the base plate 6. In this way, the respective guide plate 9, 10 is positively retained in a vertical direction, so that any lifting off of the guide plates 9, 10 from the ground 3 is securely prevented even in the case of any in this respect adverse longitudinal forces FL or transverse forces FQ occurring.

On their free top surfaces, the guide plates 9, 10 have forming elements shaped in a manner per se known, each of which form a guide for one w-shaped tensioning clamp 12, 13, respectively, serving as a spring element for tensioning the rail 1 to the solid ground 3. For tensioning the tensioning clamps 12, 13, tensioning means in the form of bolts 14, 15 are provided, which are screwed into a dowel (not shown here) inserted into the solid ground 3. During this process, the bolts 14, 15 bear, via the bolt head, on the centre portion of the tensioning clamps 12, 13 in a manner per se known, so that the tensioning clamp 12, 13 exerts the required spring-elastic retention force onto the rail base 8 via the free ends of its arms, which rest on the top surface of the rail base 8.

The lateral support of the guide plates 9, 10 is effected by means of a wedge element 16, 17 against a support angle 18, 19, respectively.

Each of the wedge elements 16, 17 has, viewed from the top, basically a triangular shape and in the mounting position, their bearing surface 20 extends parallel to the rail 2 forming an acute angle α1 (viewed from the top) of 5 to 15° with that bearing surface 21 that is associated with the respective support angle 18, 19.

At the same time, the bearing surface 20 is inclined relative to the vertical in such a way that the bottom contact surface 22 associated with the solid ground 3 is wider than the free top surface 23 of the wedge elements 16, 17.

Figure 5:
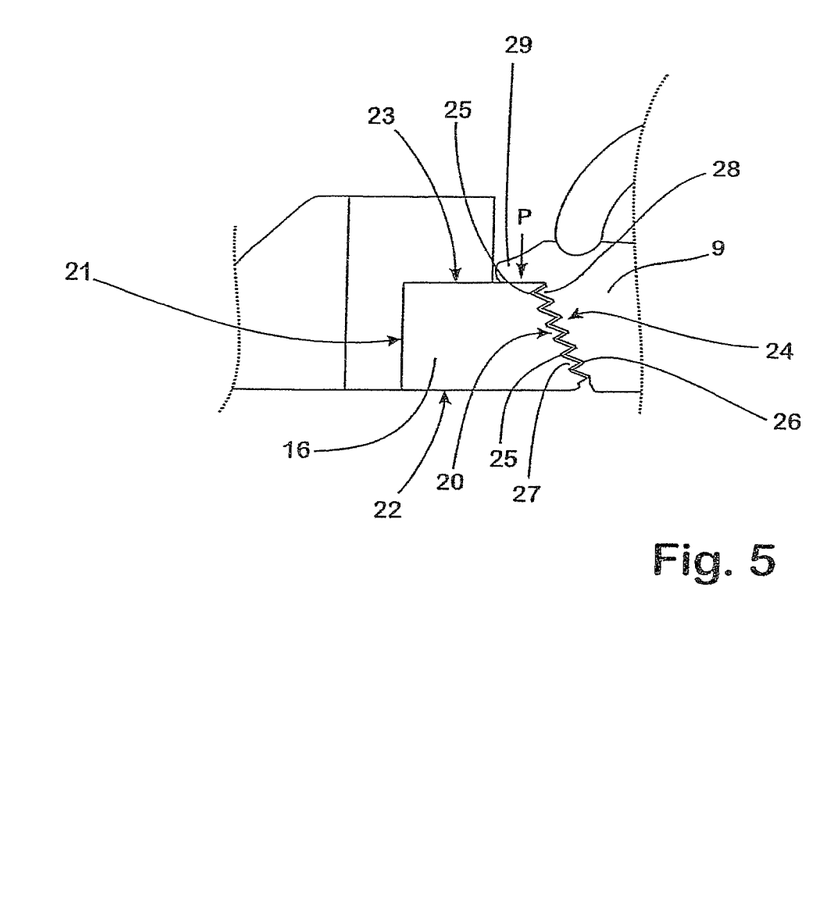
FIG. 5 shows an enlarged view of section A of FIG. 2.

Associated with the bearing surface 20 of the wedge elements 16, 17 is in each case a bearing surface 24 of the respective guide plate 9, 10, which is oriented parallel to the rail 2 and is inversely inclined. The bearing surface 20 of the wedge elements 16, 17 and the bearing surface 24 of the guide plates 9, 10 each have formed therein indentations 25, 26 and projections 27, 28, which respectively correspond to each other and which extend linearly across the width of the respective surfaces 20, 24 in such a way that the projections 27 of the respective wedge element 16, 17 engage in the indentations 26 of the respective guide plate, and vice versa.

In this way, a positive coupling of the wedge elements 16, 17 with the respective guide plate 9, 10 is achieved. The friction created in the area of this positive coupling due to the clamping forces exerted on the guide plates 9, 10 by the respective bolt 14, 15 is so great that self-locking occurs and any inadvertent movement of the wedge elements 16, 17 out of their mounting position will be securely prevented even in the presence of great transverse forces.

Clamping of the guide plates 9, 10 against the respective wedge element 16, 17 is further enhanced in each case by a loading section 29 projecting in the direction of the respective wedge element 16, 17, which loading section 29 is formed on the respective guide plate 9, 10 in the area of the transition from its bearing surface 24 to its top surface. The loading section 27 is formed and designed in such a way that, in the case of fully mounted and clamped guide plates, it exerts a compression force P on the respective wedge element 16, 17.

In order to simplify the correct orientation of the wedge elements 16, 17 relative to the guide plates 9, 10 associated therewith, markings 28 are provided on the wedge elements 16, 17 and the guide plates 9, 10, which facilitate easy reading of the respective relative position.

Figure 3:
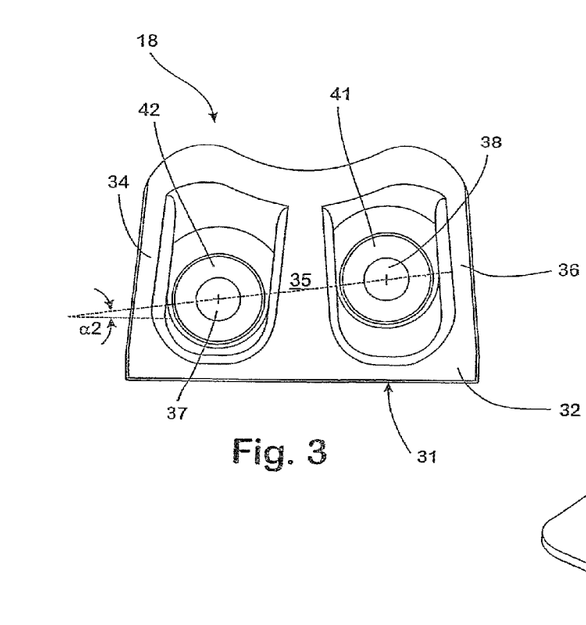
FIG. 3 shows a top view of a support angle used in the system shown in FIG. 1.
Figure 4:
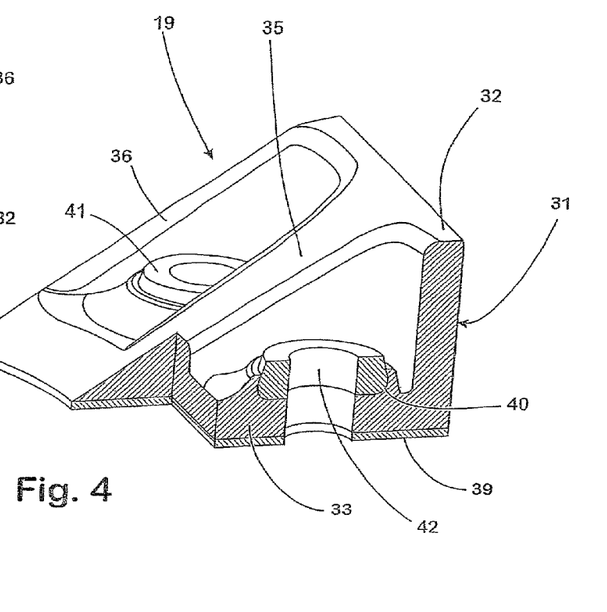
FIG. 4 shows a partially sectioned perspective view of the support angle according to FIG. 3.

The support angles 18, 19 are in each case made in one piece from a fibre-reinforced plastics material. They have a support surface 31 resting against the bearing surface 21 of the wedge element 16, 17 respectively associated therewith, the height of which is greater than the height of the wedge elements 16, 17. The support surface 31 is formed on the free front side of a support portion 32 of the support angles 18, 19, which is oriented at a right angle to a base portion 33 of the support angle 18, 19, which rests on the surface 5 of the solid ground 3.

Opposite the base portion 33, the support portion 32 is supported against the base portion 33 by means of three triangular (in a lateral view) stiffening portions 34, 35, 36 extending therefrom essentially at right angles, the free top surface of which extends from the top surface of the support portion 32 obliquely downwards. Of the stiffening portions 34, 35, 36, one each is formed on either outer edge, respectively, and the other is formed in the centre of the support angles 18, 19.

In the area of the free spaces remaining between the stiffening portions 34, 35, 36, a through-opening 37, 38, respectively, is formed in the base portion 33 of the support angles 18, 19. The distances of the centre points of these through-openings 37, 38 from the support surface 31 of the support angles 18, 19 are so different from each other that the connecting lines of the centre points of the through-openings 37, 38 form an acute angle α2 (viewed from the top) with the support surface 31, which has the same dimension as the angle α1 formed by the bearing surface 21 and the bearing surface 20 of the wedge elements 16, 17. In this way, the respective support angle 18, 19 may be readily secured by means of two dowels (not shown here) inserted into the solid ground 3 and positioned along a line extending parallel to the rail 2, in such a way that its support surface 31 bears positively against the bearing surface 21 of the respective wedge element 16, 17, which is associated therewith.

The contact surfaces of the support angles 18, 19, which are respectively formed on the bottom surface of the base portion 33, are each coated with a friction resistance-enhancing layer 39. This may be made from a rubber material which may be vulcanised directly onto the base portion 33, in order to simplify the mounting operation as much as possible, or may be placed as a loose intermediate layer between the respective support angle 18, 19 and the solid ground 3 as late as during the mounting operation itself.

Each of the through-openings 37, 38 has associated therewith a socket 40 which is circular as viewed from the top and which is integrally formed into the top surface of the base portion 33 and the centre point of which is in alignment with the centre point of the through-openings 37, 38. Each of the sockets 40 accommodates a ring serving as a tensioning element 41, 42, which is made from a spring-elastic plastics material. The height of the rings 41, 42 is dimensioned such that in the pre-mounted condition, the rings project beyond the perimeter of the respective socket 40.

For mounting the support angles 18, 19, one bolt 43, 44, respectively, is inserted in the through-openings 37, 38 and is screwed into the dowels (not shown here) beneath. As soon as the bolt head rests on the elastic rings 41, 42, any further screwing in will result in the rings 41, 42 being compressed, so that they exert an elastic return force acting against the clamping force exerted by the respective bolt 43, 44. This ensures secure retention of the bolts 43, 44 and the support angles 18, 19 even under adverse conditions.

In order to securely fill the space present between the respective guide plate 9, 10 and the support surface 31 of the support angle 18, 19 respectively associated therewith, the wedge elements 16, 17 which are each located between the respective support angle 18, 19 and the respective guide plate 9, 10 may be displaced along the rail 2. To this end, the bolt 14, 15 clamping the respective guide plate 9, 10 against the solid ground 3 is released to such a degree that the self-locking in the area of the positive coupling of the respective wedge element 16, 17 and the respective guide plate 9, 10 is released and the respective wedge element 16, 17 may be displaced. As soon as it rests positively on both sides against the bearing surface 31 of the respective support angle 18, 19 and the bearing surface 24 of the respective guide plate 9, 10, the respective fixing bolt 14, 15 is re-tightened, until the respective tensioning clamp 12, 13 exerts the required retention force onto the rail base 8 and—in connection therewith—the self-locking condition between the respective wedge element 16, 17 and the respective guide plate 9, 10 is restored.

In this way, a particularly simple adaptation of the fastening system 1 to the respective relative position of the rail 2 and the support angles 18, 19 may be achieved without having to dismantle the system 1 into its individual components.

The invention claimed is:

1. A system for securing a rail to a level solid ground, including a guide plate, for providing lateral support for the rail to be secured, a spring element in direct contact with the guide plate and having at least one spring arm exerting an elastic retaining force on the base of the rail, and tensioning means for tensioning the spring element, a separate support angle being provided, which is connectable to the solid ground and which has a bearing surface against which the guide plate rests on the side facing away from the rail base, wherein the support angle is made from a plastics material.

2. The system as claimed in claim 1, wherein the support angle is made from polyolefin or polyamide.

3. The system as claimed in claim 1, wherein the plastics material includes reinforcement fibres.

4. The system as claimed in claim 1, wherein a rough structure is integrally formed into a bottom contact surface of the support angle associated with a surface of a solid ground.

5. The system as claimed in claim 4, wherein the rough structure is formed to have a serrated cross-section.

6. The system as claimed in claim 4, wherein linear indentations running parallel to the contact surface are integrally formed into the contact surface of the support angle.

7. The system as claimed in claim 4, wherein an intermediate layer is provided, which is positioned between the contact surface of the support angle and the surface of the solid ground and which increases the friction coefficient between the contact surface of the support angle and the surface of the solid ground.

8. The system as claimed in claim 7, wherein the intermediate layer is firmly connected with the contact surface of the support angle.

9. The system as claimed in claim 1, wherein the support angle has a through-opening for the passage of a fixing bolt and a tensioning element made from an elastic plastics material is provided, and in the mounting position, the fixing bolt inserted in the through-opening exerts a return force acting against the clamping force exerted by the fixing bolt.

10. The system as claimed in claim 9, wherein means are provided on the support angle, which allow the support angle to be fastened in a position relative to the rail to be secured, in which the bearing surface of the support angle is aligned at an angle to the longitudinal axis of the rail.

11. The system as claimed in claim 10, wherein the means are formed by two through-openings integrally formed into the support angle, through each of which a fixing bolt may be inserted such that one of the fixing bolts has a distance from the bearing surface of the support angle which is different from that of the other fixing bolt.

12. The system as claimed in claim 1, wherein the support angle has means for adjusting its position in a direction normal to its bearing surface.

13. The system as claimed in claim 1, wherein the guide plate is supported against the bearing surface of the support angle via a wedge element tapered in the longitudinal direction of the rail to be secured.

14. The system as claimed in claim 13, wherein the wedge element has a first bearing surface associated with the guide plate and a second bearing surface associated with the support angle, which forms an acute angle with the first bearing surface.

15. The system as claimed in claim 14, wherein the bearing surfaces of the wedge element form an angle of 5° to 15°.

16. The system as claimed in claim 13, wherein the wedge element has a first bearing surface associated with the guide plate and a second bearing surface associated with the support angle, wherein the bearing surface associated with the guide plate has at least one projection and/or recess which may be positively coupled with at least one correspondingly shaped projection and/or recess integrally formed on the bearing surface of the guide plate, which is associated with the respective bearing surface of the wedge element.

17. The system as claimed in claim 16, wherein more than one projection and/or recess is formed on the bearing surface of the wedge element, which is associated with the guide plate.

18. The system as claimed in claim 16, wherein in the mounting condition of the wedge element, the projections and/or recesses extend parallel to a top surface of the level ground.

19. The system as claimed in claim 13, wherein a loading section is provided on the guide plate, which in the mounting position rests on a free top surface of the wedge element.

20. The system as claimed in claim 1, wherein a base plate is provided, through which the rail to be secured may be supported on the solid ground.

21. The system as claimed in claim 20, wherein the base plate has a contact surface associated with the solid ground and a support surface associated with a bottom surface of the rail base of the rail to be secured, and the support surface of the base plate is oriented, viewed in cross-section, inclined at an angle to the contact surface of the base plate.

22. The system as claimed in claim 20, wherein a projection is provided on a side of the guide plate, which is associated with the rail to be secured, which projection engages in the base plate or the rail base when in the mounting condition.

23. The system as claimed in claim 22, wherein an elastic intermediate layer is provided, on which the base plate lies, and a recess is integrally formed into the elastic intermediate layer, which in the mounting condition is engaged by the projection of the guide plate.

* * * * *